United States Patent [19]

Tokumitsu et al.

[11] Patent Number: 4,512,632

[45] Date of Patent: Apr. 23, 1985

[54] ORIGINAL READING APPARATUS

[75] Inventors: Jun Tokumitsu, Tokyo; Kazuo Minoura, Yokohama, both of Japan

[73] Assignee: Canon Kabushiki Kaisha, Tokyo, Japan

[21] Appl. No.: 640,204

[22] Filed: Aug. 10, 1984

Related U.S. Application Data

[63] Continuation of Ser. No. 250,947, Apr. 6, 1981, abandoned.

[30] Foreign Application Priority Data

Apr. 15, 1980 [JP] Japan .................................. 55-50124

[51] Int. Cl.³ .............................................. G02B 27/00
[52] U.S. Cl. ...................................... 350/167; 355/50
[58] Field of Search ...................... 350/167, 451, 292; 264/1.7; 354/101, 102, 115; 355/54

[56] References Cited

U.S. PATENT DOCUMENTS 2,393,308  1/1946  Brown ................................. 350/167
3,286,585 11/1966  McCullough et al. ............. 350/167

Primary Examiner—John K. Corbin
Assistant Examiner—Paul M. Dzierzynski
Attorney, Agent, or Firm—Fitzpatrick, Cella, Harper & Scinto

[57] ABSTRACT

This specification discloses a reading apparatus having a staggeredly arranged compound-eye optical system for divisionally forming the image of an original with respect to individual ones of a plurality of image pick-up elements juxtaposed in the primary scanning direction of the original. The compound-eye optical system comprises a plurality of lens blocks arranged in a row corresponding to said primary scanning direction, each of the lens blocks being formed with a plurality of staggeredly arranged effective plastic lens portions and a protective portion provided around and formed integrally with the effective lens portions. The boundary surface of adjacent ones of the lens blocks is inclined with respect to a plane perpendicular to the arrangement direction of the blocks so that the distance between the effective plastic lens portions and the boundary surface is greater.

7 Claims, 8 Drawing Figures

ORIGINAL READING APPARATUS

This application is a continuation of application Ser. No. 250,947, filed Apr. 6, 1981 now abandoned.

BACKGROUND OF THE INVENTION

1. Field of the Invention

This invention relates to an original reading apparatus used for facsimile or the like, and more particularly to an apparatus in which original image information to be read as a row of information is dividedly read by a plurality of solid image pick-up elements.

2. Description of the Prior Art

In recent years, compact original reading apparatus comprising a combination of a plurality of solid sensors and a minute lens array have been developed in the field of facsimile.

The outline of the reading mechanism in an original reading apparatus of the described type will be explained with reference to FIG. 1A of the accompanying drawings. In the Figure, reference numeral 1 designates an original having recorded thereon image information to be read, and reference numerals $4_1$ and $4_2$ designate a plurality of solid image pick-up elements (such as, for example, CCD or photodiode arrays) juxtaposed in primary scanning direction which is the secondary direction of the original, and in the Figure, there is shown an example in which two such elements are juxtaposed. Reference numeral $3_1$ designates an optical system for projecting on a reduced scale the image information of the upper left half portion $a_1$ of the image information along the primary scanning line (reading line) A of the original onto the image pick-up surface of the solid image pick-up element $4_1$, and reference numeral $3_2$ denotes an optical system for projecting on a reduced scale the image information of the right half portion $a_2$ onto the image pick-up surface of the other element $4_2$. That is, the image information of the original 1 is dividedly read along the primary scanning line A by the elements $4_1$ and $4_2$. With the original 1 brought into longitudinally downwardly or upwardly moved condition, namely, with the original brought into secondary scanned condition, the image information on the entire surface of the original 1 is read by the elements $4_1$ and $4_2$.

Thus, on the reception side, the same image information as the original 1 is reproduced on the basis of the reading signals from the elements $4_1$ and $4_2$.

In such an original reading apparatus, there are generally non-sensitive portions at the opposite ends of each element $4_1$, $4_2$ and therefore, a skip of reading area exists between the elements $4_1$ and $4_2$. In a case where the imaging optical systems are reduction systems as shown in FIG. 1A, reading of a row of continuous images on the original is possible in spite of the presence of the skip between the elements, but if the reduction magnification m is small, the length of the optical axis between the surface of the original and the surface of the elements becomes great and this is against the desire to make the apparatus compact and therefore, it is preferable that the system be as approximate to a one-to-one magnification system as possible. As a method of improving this, there is a system whereby a plurality of light-receiving elements are arranged in staggered relationship so that two rows of original lines are read mutually complementarily, whereafter those signals are combined. Along therewith, the optical system also becomes a staggeredly arranged compound-eye system.

FIG. 1B of the accompanying drawings is a schematic view showing an example of the original reading apparatus using a staggeredly arranged lens array. In FIG. 1B, reference numeral 1 designates an original, reference characters $2_1$, $2_2$, $2_3$, ... $2_n$ denote reading lines of the original by individual lenses of the lens array, reference characters $3_1$, $3_2$, $3_3$, ... $3_n$ designate lenses, and reference characters $4_1$, $4_2$, $4_3$, ... $4_n$ denote solid sensors. The lenses $3_1$, $3_2$, $3_3$, ... $3_n$ respectively image the portions on the reading lines $2_1$, $2_2$, $2_3$, ... $2_n$ of the original 1 onto the solid sensors $4_1$, $4_2$, $4_3$, ... $4_n$ and at the same time, the portions lying at mutually complementary positions of two lines of the original 1 are read. The signals so read are added to the signals of the odd-numbered solid sensors $4_1$, $4_3$, ... by delaying the signals of the even-numbered solid sensors $4_2$, ... $4_n$ and are delivered to a recording apparatus as the reading signals of a right line of the original 1. Alternatively, in a case where the recording apparatus is provided with a staggeredly arranged output thermal head, ink jet head, etc. corresponding to the lens array and solid sensors of the original reading apparatus, the read signals are intactly delivered to the recording apparatus, where recording is effected in the order of reading.

SUMMARY OF THE INVENTION

It is an object of the present invention to provide a reading apparatus having a staggered compound-eye optical system which is inexpensive and easy to manufacture.

It is a further object of the present invention to provide an apparatus which can effect reading with a stable imaging performance without being combered by external factors such as humidity even if the compound-eye optical system is formed by a plurality of lens blocks formed of plastic.

The invention will become fully apparent from the following detailed description thereof taken in conjunction with the accompanying drawings.

DESCRIPTION OF THE PREFERRED EMBODIMENTS

Figure 1A:
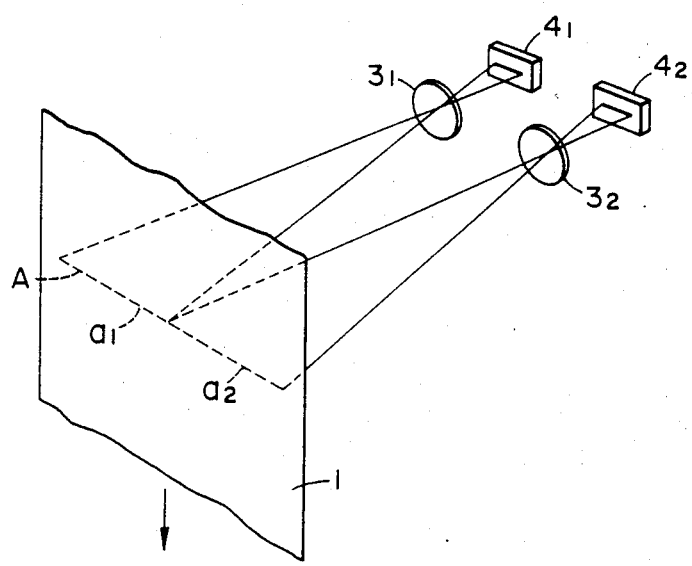
FIGS. 1A and 1B are schematic views showing examples of the original reading apparatus using a staggeredly arranged lens array.
Figure 1B:
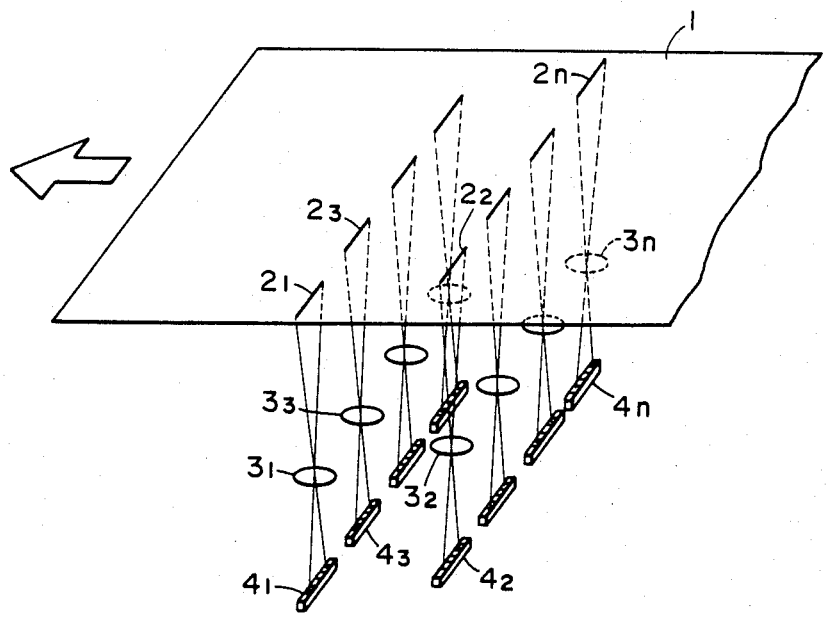
Figure 2:
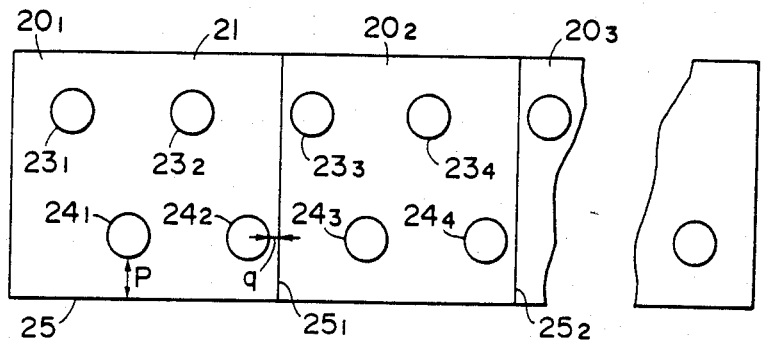
FIG. 2 shows an unpreferable example in which a staggered plastic compound-eye system comprises a connection of a plurality of lens blocks.

FIG. 2 shows a method in a case where a staggered plastic compound-eye system is formed by connection of a plurality of blocks. In FIG. 2, reference numerals $23_1$, $23_2$, ... and $24_1$, $24_2$, ... designate effective plastic lens portions, and reference numeral 21 denotes a protective portion against humidity which is also formed of plastic. In this example, the width of the protective portion is such that, for example, the distance P between the effective plastic lens portion $24_1$ and the outer end surface 25 of the protective portion is equal to or greater than a predetermined length, preferably equal to or greater than $\frac{1}{2}$ of the thickness of the effective lens portions. If this condition is satisfied, even when moisture entered into the effective lens portions from the opposite sides, moisture has already enterd into the whole of the effective lens portions from the upper and lower surfaces thereof and the refractive index distribution in a direction perpendicular to the optical axis which is deleterious to the lens performance is not produced. This is already well known. Now, in a case where the staggeredly arranged compound-eye system as shown in FIG. 2 is formed by blocks having an end surface perpendicular to the arrangement direction, particularly, where such system is formed by a connection of part blocks $20_1$, $20_2$, $20_3$, ... having several effective lens portions as shown in FIG. 2, the distance q between the boundary surface $25_1$, $25_2$, ... and the effective lens portion $24_2$, $24_4$, ... is very small and the lens performance is varied by moisture entering through the boundary surface. The present invention provides a compound-eye optical system which is free of such a disadvantage.

Figure 3:
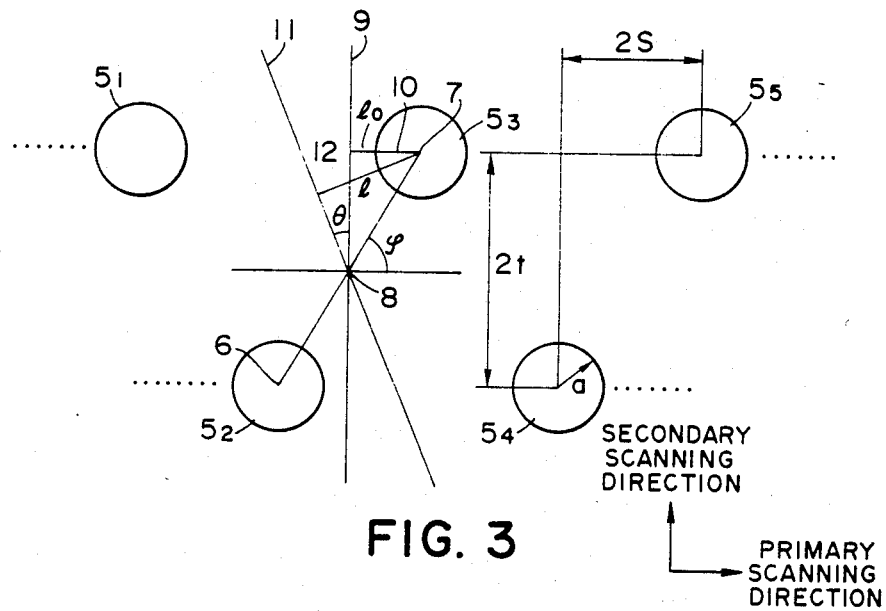
FIG. 3 is a view for illustrating a compound-eye optical system used in the reading apparatus of the present invention.

FIG. 3 is a partly enlarged plan view of a compound-eye system for illustrating such a construction. Reference numerals $5_1$, $5_2$, ... $5_5$ designate lenses staggeredly arranged correspondingly to the staggered arrangement of sensors. Reference numerals 6 and 7 denote the optical axes of the lenses $5_2$ and $5_3$, respectively, and reference numeral 8 designates an axis lying in a plane containing the optical axes 6 and 7 and parallel to and equidistant from the optical axes 6 and 7. The pitch of the lenses is 2S in the primary scanning direction (in the Figure, the direction of the reading line) and 2t in the secondary scanning direction (the direction perpendicular to the primary scanning direction), and the diameter of each lens is 2a. It is to be understood that the lenses $5_2$ and $5_3$ belong to different adjacent blocks. It is desirable that the boundary surface between the blocks be as distant from the lens as possible. Therefore, it is to be understood that the boundary between the blocks is a plane parallel to the secondary scanning direction and containing the axis 8, as indicated by 9. Reference numeral 10 designates a perpendicular from the optical axis 7 to the boundary surface 9. The distance $l_0$ from the boundary surface 9 to the end of the lens is $$l_0 = S - a \tag{1}$$

The reason why the boundary surface 9 is made to contain the axis 8 is that the distances from the lenses $5_2$ and $5_3$ to the boundary surface 9 are made equal.

When the diameter of the lens is great and approximate to the lens pitch in the primary scanning direction, $l_0$ becomes approximate to 0 as is clear from equation (1) and therefore, moisture may enter into the lens portions from the circumference of the block and the advantage of having made the lenses into a unitary block would be lost. To solve this problem, according to the present invention, this boundary surface is inclined correspondingly to the arrangement of the lenses. In FIG. 3, reference numeral 11 designates a boundary surface inclined by an angle $\theta$ with respect to the boundary surface 9. For the same reason as that previously described, it is desirable that the boundary surface 11 contain the axis 8. Reference numeral 12 denotes a perpendicular from the optical axis 7 to the boundary surface 11. Assuming that the angle which the plane containing the optical axes 6 and 7 forms with the primary scanning direction is $\phi$, the distance l from the boundary surface 11 to the end of the lens is $$l = \sqrt{S^2 + t^2} \cos(\theta - \phi) - a \tag{2}$$

Figure 4:
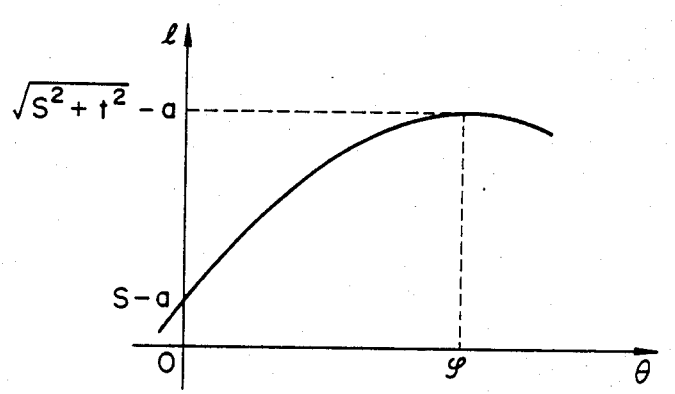
FIG. 4 illustrates the relation between the inclination of the boundary surface of the lens block and the distance from the boundary surface to the end of the lens.

Equation (2) may be graphically expressed as shown in FIG. 4. That is, by inclining the boundary surface as indicated at 11, the distance from the boundary surface to the end of the lens is increased. This distance assumes a maximum value $$\sqrt{S^2 + t^2} - a$$

when $\theta = \phi$, but if $\theta = \phi$ when $t > S$, the lenses $5_1$, $5_4$ and the boundary surface come near each other and therefore, in that case, it is desirable that $\theta = (\pi/2) - \phi$, that is, the boundary surface 11 be made parallel to the plane containing the optical axes of the lenses $5_1$ and $5_2$. In any case, it is most preferable that the boundary surface be provided parallel to a plane passing through the optical axes of two mutually proximate lens portions in different rows of the staggered arrangement.

In the case of the boundary surface 9, for example, when the diameter 2a of the lens is equal to the lens pitch 2S in the primary scanning direction, $l_0 = 0$ from $S = a$ and the lenses unavoidably are contiguous to the block boundary surface, but if the boundary surface is inclined like the boundary surface 11, the lenses will be kept away from the end surface of the block, whereby entry of moisture may be prevented.

Figure 5:
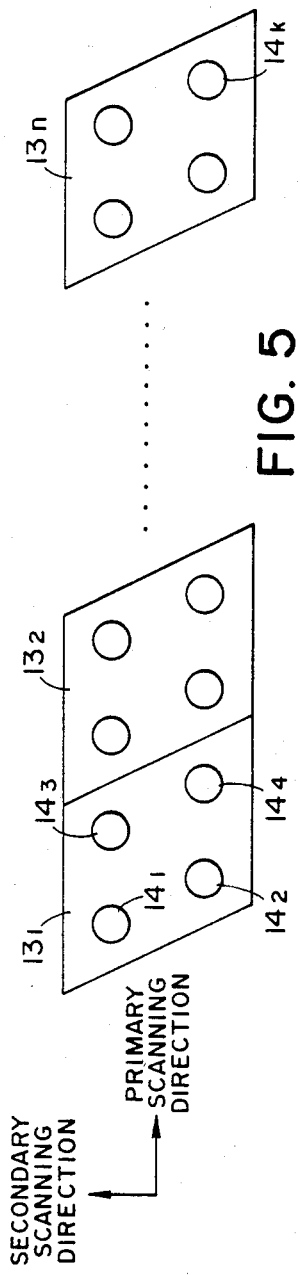
FIGS. 5, 6 and 7 show various embodiments of the compound-eye optical system applied to the reading apparatus of the present invention.

FIG. 5 shows a first embodiment of the present invention. Reference numerals $13_1$, $13_2$ ... $13_n$ designate lozenge-shaped lens blocks, and reference numerals $14_1$, $14_2$, $14_3$, $14_4$, ... $14_k$ denote individual effective plastic lens portions. The lens blocks $13_1$, $13_2$, ... $13_n$ are formed of plastic such as PMMA (polymethylmethacrylate) and each of them includes four effective plastic lens portions. If these lens blocks are arranged in a row as shown in FIG. 4, there will be provided a staggeredly arranged lens array.

Figure 6:
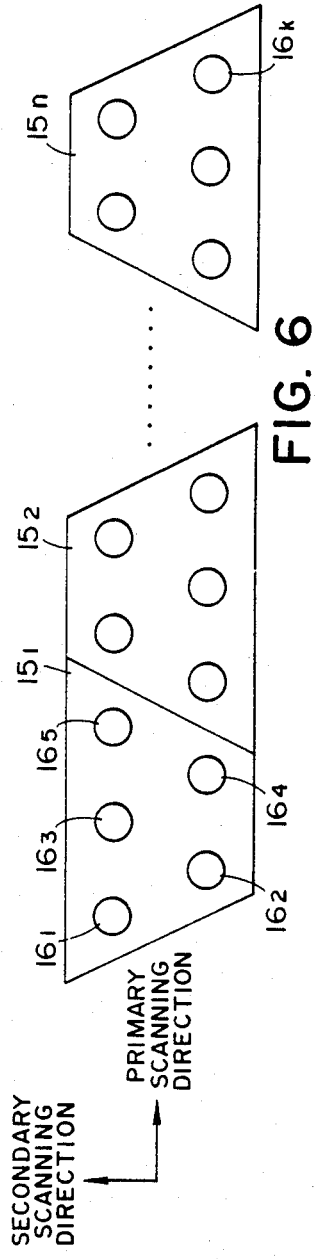

FIG. 6 shows a second embodiment of the present invention. Reference numerals $15_1$, $15_2$, ... $15_n$ designate trapezoidal lens blocks, and reference numerals $16_1$, $16_2$, $16_3$, $16_4$, $16_5$, ... $16_k$ denote individual effective plastic lens portions. In a case where the number of lenses per block is an odd number such as five as shown in FIG. 6, lens blocks of the same shape may be manufactured and arranged in a positional relationship wherein they have alternately been rotated through 180°.

Figure 7:
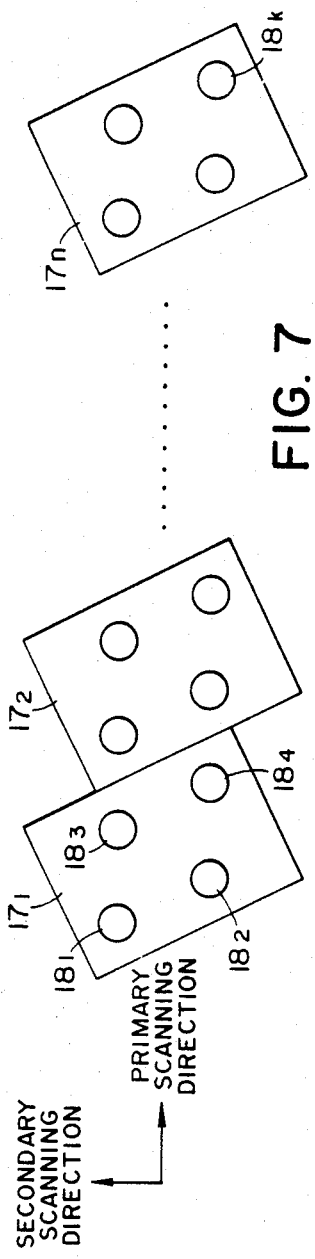

FIG. 7 shows a third embodiment of the present invention. Reference numerals $17_1$, $17_2$, ... $17_n$ designate rectangular lens blocks, and reference numerals $18_1$, $18_2$, $18_3$, $18_4$, ... $18_k$ denote individual effective plastic lens portions. In this embodiment, the circumference of each lens block is of a rectangular shape which leads to greater ease and higher accuracy with which the lens blocks are manufactured.

In the description of these embodiments, the number of lenses per lens block has been shown as four to five, but of course, the present invention may be carried out for any other number.

According to the present invention, as has hitherto been described, a staggeredly arranged lens array can be constructed which is less susceptible to the influence of fluctuation of humidity, and this leads to the provision of a compact original reading apparatus having an optical system which is stable in performance and inexpensive and easy to manufacture.

What we claim is:

1. An original reading apparatus comprising:
a plurality of image pick-up means disposed in the primary scanning direction of an original; and
a compound-eye optical system for forming an image of the original on said image pick-up means, said compound-eye optical system including end surfaces, a plurality of plastic effective lens portions arranged in a staggered fashion along said primary scanning direction and a plastic protective portion provided around and formed integrally with said effective lens portions to protect said effective lens portions against moisture entry from side surfaces of said effective lens portions, said protective portion separating said effective lens portions from said end surfaces of said compound-eye optical system by more than a predetermined length, said compound-eye optical system being divided into a plurality of lens blocks, each of said lens blocks including a plurality of said effective lens portions, the boundary surface defined between adjacent ones of said lens blocks being defined in said protective portion and being inclined at an oblique angle with respect to a plane perpendicular to said primary scanning direction so as to make the distance between said effective lens portion and said boundary surface greater than if said boundary surface were perpendicular to said primary scanning direction.

2. An original reading apparatus according to claim 1, wherein said boundary surface is substantially parallel to a plane containing the optical axes of two mutually proximate effective lens portions in different rows of said staggered arrangement.

3. An original reading apparatus according to claim 1, wherein the distance between said boundary surface and said effective lens portions is equal to or greater than $\frac{1}{2}$ of the thickness of said effective lens portions in the direction of the optical axis.

4. An original reading apparatus according to claim 2, wherein said lens blocks are lozenge-shaped.

5. An original reading apparatus according to claim 2, wherein said lens blocks are trapezoidal.

6. An original reading apparatus according to claim 2, wherein said lens blocks are rectangular.

7. An original reading apparatus according to claim 1, wherein said boundary surface comprises a plane whose intersection with a plane defined by the optical axes of two adjacent effective lens portions in different rows of staggeredly arranged effective lens portions of adjacent lens blocks is parallel to and is spaced equidistantly from said optical axes of said adjacent effective lens portions.

* * * * *